Oct. 31, 1933.     S. MOREIRA     1,933,444
RAIL BOND AND METHOD OF MAKING SAME

Filed March 18, 1931

Inventor:
SALVADOR MOREIRA,
By: *Usina & Rauber*
his Attorneys.

Patented Oct. 31, 1933

1,933,444

UNITED STATES PATENT OFFICE 1,933,444

RAIL BOND AND METHOD OF MAKING SAME

Salvador Moreira, Worcester, Mass., assignor to The American Steel and Wire Company of New Jersey, a corporation of New Jersey Application March 18, 1931. Serial No. 523,597

2 Claims. (Cl. 173—278)

This invention relates to rail bonds and a method of making same, and the primary object in view is to provide a simple and cheaply made yet very efficient form of rail bond comprised of copper or steel strands or like conducting material having welded fused ends and mechanically attached terminals.

The ends of the strands of wire rope or cable comprising the bond are completely fused together and given a tapered conical shape, and the method adapted in fusing these ends is characterized by its simplicity, the strands of cable being held between a set of dies, then a heavy current is applied, and when the section of cable between the dies reaches the proper fusing or welding heat, the dies are drawn away from one another, thus separating the strands and at the same time the separated ends of the strands are caused to converge inwardly and fuse together in conical or tapered solidified welded relation. The terminals are then applied to the ends of the cable and the bond is ready for use.

The drawing illustrates diagrammatically the method of forming a bond in accordance with the present invention together with the resultant product, and therein:—

Figure 1:
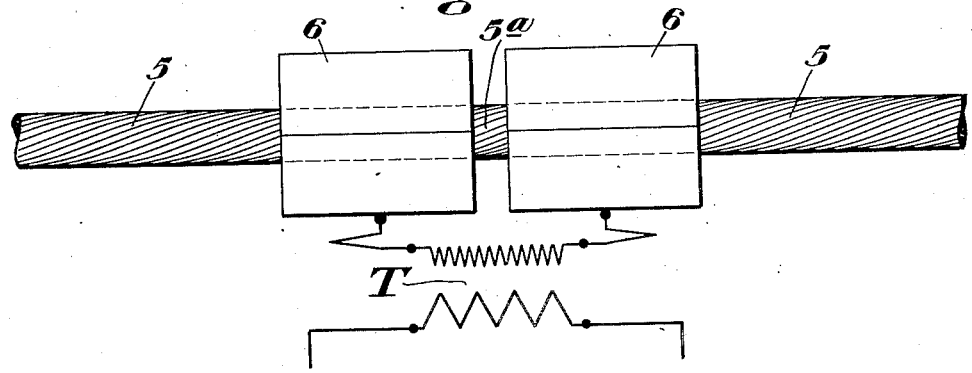
Figures 1 and 2 are views in side elevation of a section of cable held between a pair of dies which are adapted to be electrically energized, Figure 1 showing the cable as it is being brought to a welding heat and Figure 2 showing the dies in the process of separating the cable.
Figure 2:
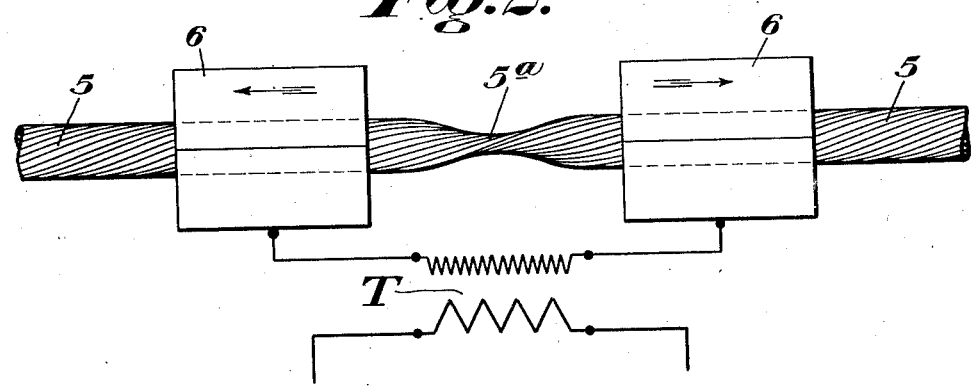
Figure 3:
Figure 3 is a view of the cable for the bond showing the conical ends with the electrically fused strands.

In carrying out the method, a section of the wire cable or rope 5 is held between a pair of dies 6, which may be of any suitable construction, such as the dies commonly used in welding rope ends, and a relatively heavy current passed through the dies and cable. This current may be an induced current which is set up by means of the transformer diagrammatically illustrated at T, a method which is well understood in the art. When the section 5ª of the cable between the dies 6 reaches a predetermined fusing or welding heat, the dies are drawn away from one another while tightly holding the strands, thus separating the cable and bringing the ends of the strands together in fused or welded relation, the separated ends of the cable assuming a conical shape, as clearly shown in Figure 3.

As the circumferential portion of the cable reaches a greater heat than the inner portion thereof, the strands first separate on the outer perimeter of the cable and the ends are drawn inwardly and fuse together, the ends naturally assuming the conical shape just specified.

It will be noted that there is no twisting of the strands nor is it necessary to apply pressure around the section of the cable between the dies, methods heretofore adopted in the welding of wire rope ends. Also there is no mechanical severing action, the simple act of separating the strands by pulling tension automatically bringing the ends of the strands together in fused relation.

Figure 4:
Figure 4 shows the completed bond with the terminals attached.

After the cable has been separated and the ends welded as just described, the terminals 7 are mechanically applied thereto, as shown in Figure 4, and the bond is complete.

What I claim is:

1. The method of making rail bonds, which consists in gripping a section of stranded wire cable between a pair of dies, electrically energizing the dies and section to bring the latter to a welding temperature, then drawing the dies away from one another to exert a pulling tension on the cable and separate the latter between the dies, the circumferential portion of the cable converging inwardly as the cable is separated and fusing in tapered welded relation, and finally applying terminals to the ends of the cable.

2. A rail bond comprising a conductor composed of strands, the ends of each of the strands being fused together in tapered relation, and a pair of terminals each comprising a sleeve portion and an attaching metal receiving portion, said conductor having its ends inserted through said sleeve portions of said terminals and overlying a part of said attaching metal receiving portion whereby the attaching metal, when deposited on said terminals, will secure said terminals and said conductor ends together and to the rail.

SALVADOR MOREIRA.